United States Patent [19]

Rinder

[11] Patent Number: 4,643,654
[45] Date of Patent: Feb. 17, 1987

[54] SCREW ROTOR PROFILE AND METHOD FOR GENERATING

[75] Inventor: Laurenz Rinder, Vienna, Austria

[73] Assignee: American Standard Inc., New York, N.Y.

[21] Appl. No.: 775,186

[22] Filed: Sep. 12, 1985

[51] Int. Cl.[4] .............................................. F04C 18/16
[52] U.S. Cl. .................................... 718/201; 418/150
[58] Field of Search ................. 418/150, 201; 409/42, 409/46, 47

[56] References Cited

U.S. PATENT DOCUMENTS

| 4,028,026 | 6/1977 | Menssen | 418/201 |
| 4,053,263 | 10/1977 | Ingalls | 418/201 |
| 4,109,362 | 8/1978 | Ingalls | 29/156 |
| 4,227,869 | 10/1980 | Eriksson | 418/206 |
| 4,412,796 | 11/1983 | Bowman | 418/201 |
| 4,445,831 | 5/1984 | Ingalls | 418/201 |
| 4,508,496 | 4/1985 | Bowman | 418/201 |

Primary Examiner—Carlton R. Croyle
Assistant Examiner—Jane E. Obee
Attorney, Agent, or Firm—Ronald M. Anderson; William J. Beres; Carl M. Lewis

[57] ABSTRACT

A screw rotor profile for both male and female rotors is generated from a single rack in which each individual rack segment includes four discrete circular arc segments and two discrete straight line segments. The leading and trailing flanks of the lobes of both the male and female rotors generated by the rack include involute portions disposed between tangent circular-arc-generated portions. A method for developing the rack is also disclosed.

19 Claims, 7 Drawing Figures

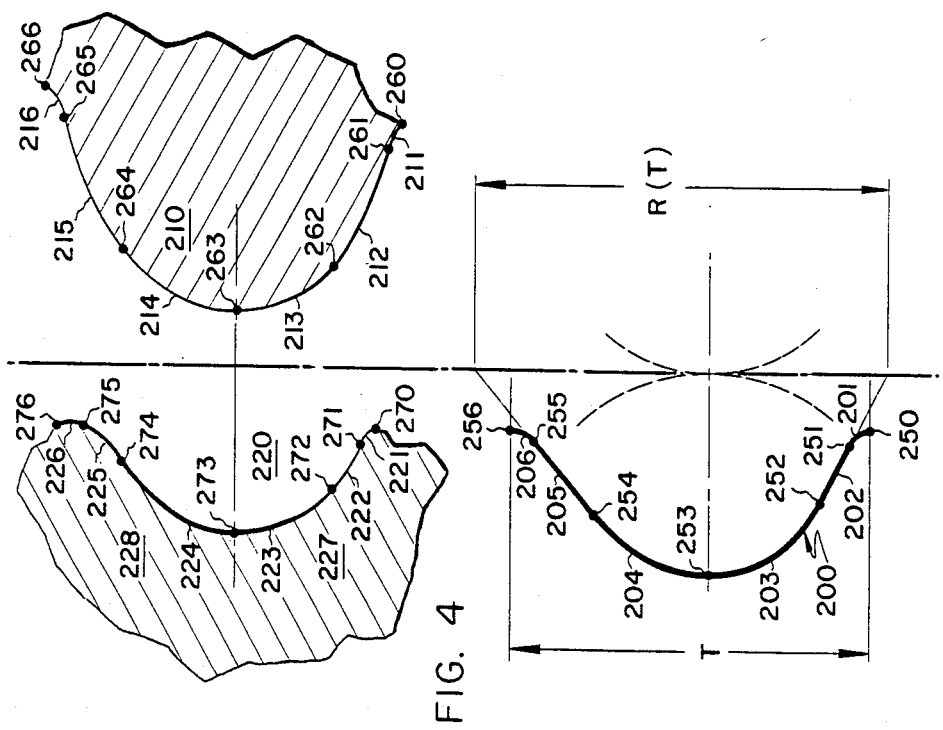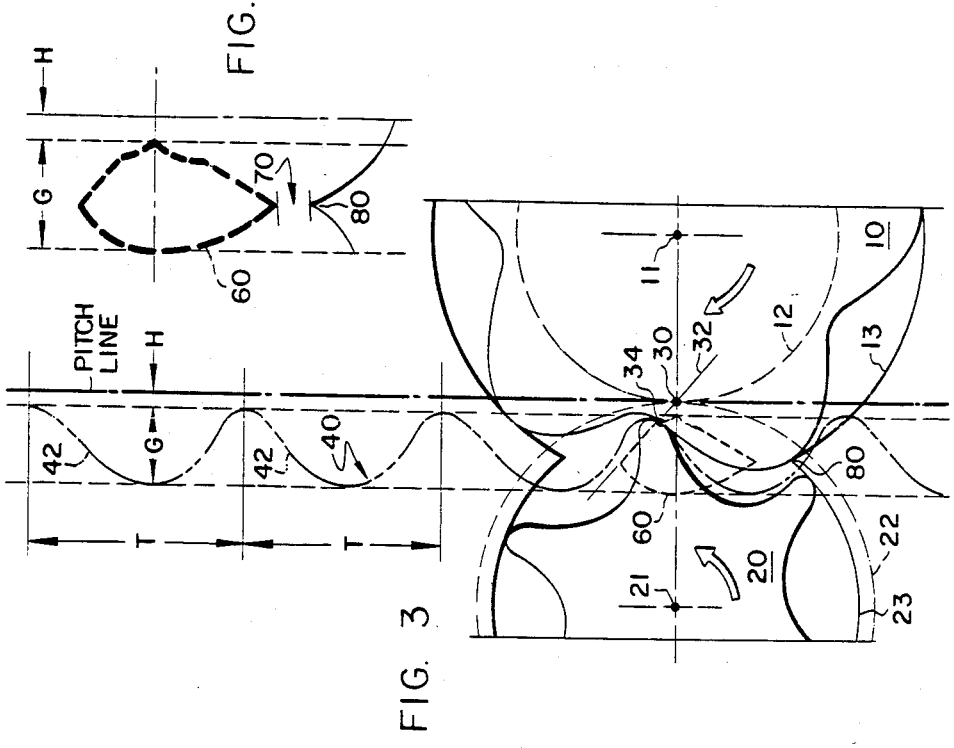

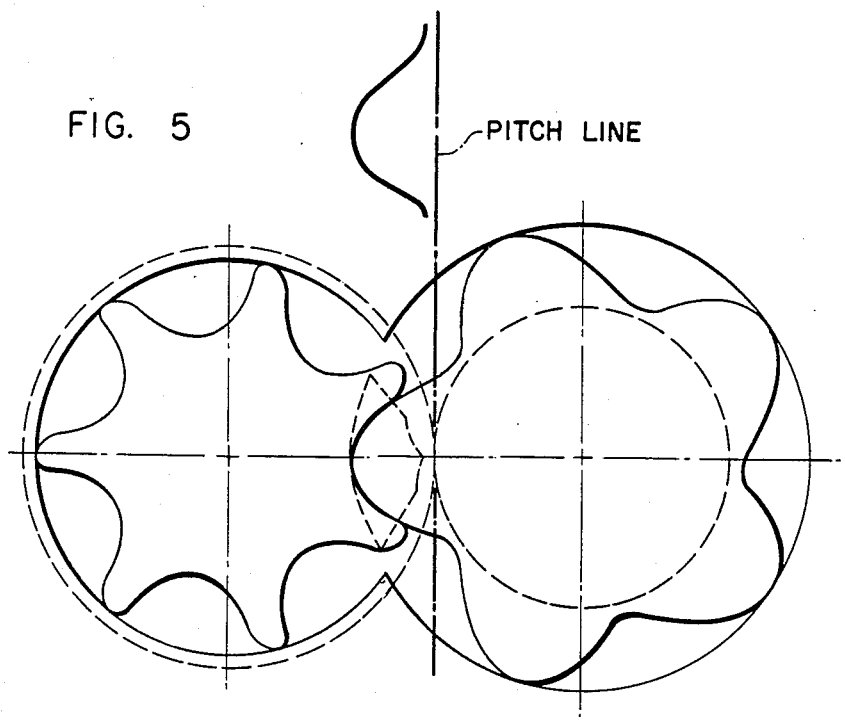
FIG. 5 — PITCH LINE
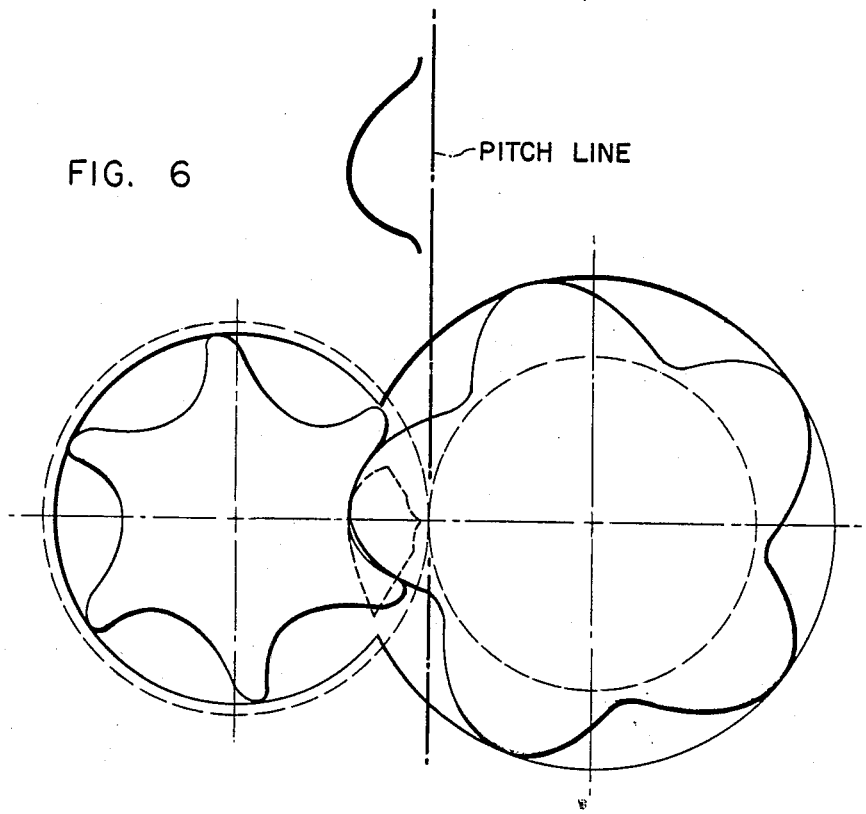
FIG. 6 — PITCH LINE

SCREW ROTOR PROFILE AND METHOD FOR GENERATING

FIELD OF THE INVENTION

The present invention relates to a complementary pair of helical screw rotors for use in a rotary screw machine. More particularly, the present invention relates to a screw rotor profile. Further, the present invention relates to a method for defining the profile of a screw rotor set wherein each of the leading and trailing flanks of both the male and female rotor profiles include involute portions. Finally, the present invention relates to a profile for a screw rotor set for use in refrigeration compressor applications and a method for defining the rack from which such a profile is generated.

BACKGROUND OF THE INVENTION

A screw compressor characteristically includes a rotor housing which defines a working chamber in which cooperating screw rotors are disposed. The working chamber is closely dimensioned to the outside diameter and length dimensions of the meshed pair of screw rotors disposed therein and therefore is a volume generally shaped as two intersecting parallel cylindrical bores. The male rotor characteristically consists of adjoining lobes having leading and trailing flanks which are convex. The female rotor consists of lobes having leading and trailing flanks which are concave. Conventionally, it is said that the major portion of the male rotor lobes and grooves are located outside of the pitch circle of the male rotor. Likewise, it is conventionally stated that the major portion of each female rotor lobe and groove is found within the pitch circle of the female rotor. The wrap angle of the male rotor is typically less than 360°.

A suction port is disposed at one end of a screw compressor and is the inlet through which a gas to be compressed is received between the screw rotors within the working chamber of the compressor. As the rotors rotate and mesh, the volume in which such gas is initially received between the rotors decreases and is moved axially between the rotors toward the opposite end of the working chamber where a discharge port is located.

A primary concern in the design of screw compressors, as with other compressors, is the maximization of compressor efficiency. Screw compressor efficiency relates directly to the design of the helical screw rotors disposed within the working chamber of the compressor. The efficiency of a screw rotor set depends upon both the rotor profile chosen and the degree of precision to which the rotors can be manufactured. The rotor profile should preferably minimize the leakage paths between the rotors and the rotor housing while not being so complicated as to be entirely uneconomical to design and manufacture. A screw rotor profile is the profile of a rotor set taken in a plane transverse to the parallel axes of male and female rotors.

As is recognized throughout U.S. Pat. No. 4,412,796, the screw rotor profile art is a crowded and well-developed one. Yet, that patent is correct in its assertion that while improvements in the art come in small increments, such refinements, whether they be in the area of improved compressor performance, energy savings, the methods by which profiles are obtained or in the area of improved ease of rotor manufacture, represent meritorious and innovative advances in the screw compressor art.

There is no lack of teaching concerning the historical development of screw rotor profiles. U.S. Pat. Nos. 3,423,017; 4,460,322; and 4,508,496 all provide valuable background and insight into screw rotor profile design. Such names as Lysholm, Whitfield, Nilsson, Perssön and Schibbye were preeminent in the development of basic screw rotor technology in the 1940's, 1950's and in the 1960's. Seemingly, the primary focus in the 1970's and 1980's has been on the refinement of screw rotor profiles so as to obtain enhanced machine efficiencies and/or the development of profiles which are more easily and economically manufactured in quantity yet which are acceptably efficient.

One rotor profile feature which has been recognized of late as being advantageous to screw rotor profile design is the use of involute curves to define at least a portion of the rotor profile. The use of such curves is advantageous both from the standpoint of ease of rotor manufacture and compressor efficiency. Perhaps the first to identify the advantages of involute curved surfaces with respect to screw rotor profiles was Menssen whose U.S. Pat. No. 4,028,026 has its roots in a German patent application filed in 1972. Menssen's U.S. patent discloses a screw rotor profile having involute curved portions on both the leading and trailing flanks of both the male and female rotor. It does, however, also teach a profile replete with corners and discontinuities between lobe portions. Menssen makes a brief reference to the generation of his profile by a set of racks which are coincident along 75% of their length. How or why such racks are developed is not discussed in any detail. Ingalls' U.S. Pat. Nos. 4,053,263 and 4,109,362 have their roots in a patent application filed in 1973. These relatively early U.S. patents to Ingalls also relate rotor profiles containing involute portions. Three significantly more recent U.S. Pat. Nos. 4,445,831, again to Ingalls, and 4,412,796 and 4,508,496 both to Bowman, teach the use of involute curved portions on a screw rotor profile. None of the aforementioned patents, however, teaches the advantageous rotor profile disclosed herein which is generated in an uncomplicated fashion and the use of which results in efficient rotor sets capable of economical manufacture in quantity.

SUMMARY OF THE INVENTION

It is an object of the present invention to provide a profile for an economically manufactured yet efficient rotor set for a rotary screw compressor.

It is a further object of this invention to provide a method for generating such a profile.

It is still a further object of this invention to modify the conventional and well-known principles of involute gear design for use in designing helical screw rotors for compressor applications.

Finally, it is an object of this invention to provide a screw rotor profile for an efficient pair of screw rotors where both the male and female rotors are generated from a single rack which consists only of straight line and circular arc segments.

While several of the basic premises found in the design of screw rotors are related to the premises upon which helical gears are designed, the well-known conventional principles of gear design are not compatible, without major modification, with the design of helical screw rotors for compressor applications. If directly applied to the design of helical screw rotors, gear design principles would result in entirely unacceptable leakage paths within the compressor, wide gaps between the lobes of one rotor and the cooperating groove of the opposite rotor and compressors with such minimal capacity as to be unsuitable for the intended purpose of gas compression. Specifically, conventional gear design principles would result in screw compressors with large blow holes, open mesh lines, unacceptable negative torque characteristics, power inefficiency and a number of rotor lobes so large as to preclude the existence of a meaningful volume between rotors in which to accept gas for compression. It must be appreciated that the purpose of helical gears is to transmit power or motion, one gear to the next, while the purpose of helical screw rotors is to compress a gas between the rotors in cooperation with the housing in which the rotors are disposed. For convenience in understanding of established gear design standards and principles, reference may be had to THE MECHANICAL DESIGN AND SYSTEMS HANDBOOK, edited by Rothbart (McGraw-Hill: 1964) and PRECISION GEARING THEORY AND PRACTICE by Michalec (John Wiley & Sons: 1966).

In the present invention the basic trapezoidal, cornered rack used to generate helical gears is radically modified so as to generate a screw rotor profile from which relatively easily manufacturable screw rotors of acceptable efficiency can be produced. A small number of rotor lobes (generally less than 10 and preferably less than 8) is required of helical screw rotors in order to allow for a suitable ratio between the volume of the lobes and the area of the leakage paths within the compressor. In conventional gear design any number of teeth less than on the order of 20 teeth is taught to be unacceptable due to the profile inaccuracy, sliding, tooth sharpness and undercutting which would result.

In accordance with the teachings herein, screw rotor profiles with the requisite small number of lobes can be generated from a defined rack without the undercutting of any rotor lobe. Additionally, a closed mesh line and small blow hole can be obtained. The mesh line is the path of contact of cooperating rotor lobes and represents a leakage path in screw compressor applications. The shorter the mesh line, the less is the available leakage area between adjacent gas containing volumes within the compressor which are at different pressures. In accordance with the teachings herein, a rack for generating a screw rotor profile consists only of discrete rack segments each of which is identical and includes only four circular arc segments and two straight line segments with all segments of the rack joining tangentially. Further, the rack is established so that no portion of the male or female rotor profile crosses its respective pitch circle and the entirety of the male rotor profile is outside the pitch circle of the male rotor while the entirety of the female rotor profile is inside the pitch circle of the female rotor. The use of a tangent circular arc segments on the rack results in a closed mesh line being obtained. Also, by virtue of the manner in which the rack is defined, the size of the blow hole can be minimized by extending or optimizing the length of a selected portion of the mesh line. The portions of the rack which are of most significance with respect to minimizing blow hole area and mesh line length are the straight line segments of the rack. Each straight line rack segment generates an involute curve on the profiles of both the male and female rotors. The involute portions are desirable, in part, because the portion of the mesh line which results from the use of involute curves on the rotor profile is a straight line. Since a straight line is the shortest distance between two points, the length of the leakage path within a screw compressor is minimized. The length of the mesh line is therefore directly related to the length of the involute portion on the rotor profile and the length of the straight line segment on the rack from which the involute portion of the profile is generated. The rack can be thought of as a thin strip or line of material which runs through and between the meshing rotating rotors and which, at any given moment or position is in contact with a single point on each of the rotors.

The rack of the present invention consists of a preselected number of identical, interconnected individual rack segments each of which individual rack segments is defined by six discrete segments. The six segments which make up a complete individual rack segment in all cases include four circular arc segments and two straight line segments with each straight line segment being disposed between a different pair of circular arc segments. The rotor profiles which result are typically and preferably asymmetrical and each of the leading and trailing flanks of each of the lobes on both the male and female rotors include an involute portion disposed between the discrete individual curved portions generated by the pair of circular arc segments on the rack which adjoin the straight line segment from which the involute is generated. The profile of the male rotor is characterized by individual lobes having convex leading and trailing flanks while the profile of the female rotor is characterized by concave leading and trailing lobe flanks. Each portion of both the leading and trailing flanks of the lobes on both the male and female rotor transitions smoothly into the adjoining profile portions so that the profiles of both the male and female rotors are smooth and devoid of point discontinuities. Such smooth transition is accomplished by the definition of the generating rack to include only rack segments which are tangent, in the geometric sense, at their point of intersection.

In operation, each portion of the profile of the male rotor interacts with a portion on the female rotor profile generated by a circular arc or straight line segment identical to the segment which generated the cooperating portion on the male rotor profile. As a result, an involute portion on a male rotor lobe interacts only with an involute portion on the female rotor and both interacting involute portions will have been generated from an identical straight segment of the rack. Likewise, each discrete circular-arc-generated curved portion on a male rotor lobe, of which there will be four, interacts with a cooperating curved portion on a female rotor lobe which is generated by a circular arc on the rack identical to the one which generated the cooperating portion on the male rotor.

Among the advantages of the present invention are ease of profile definition, ease and economy of rotor manufacture (as by hobbing), the minimization of blow hole size and the existence of a closed mesh line of minimal length, all of which go to minimizing the leakage paths within a screw compressor.

DESCRIPTION OF THE DRAWING

FIG. 3 illustrates how the rack of the present invention generates the rotor profile of the present invention.

FIG. 3A more clearly illustrates the mesh line and blow hole of FIG. 3.

FIG. 4 illustrates in detail each portion on the lobes of the profiles of a male and female rotor of the present invention and their relationship to the rack segments from which they are generated.

FIGS. 5 and 6 illustrate two other rotor profiles developed in accordance with the teachings herein.

DESCRIPTION OF THE PREFERRED EMBODIMENT

Figure 1:
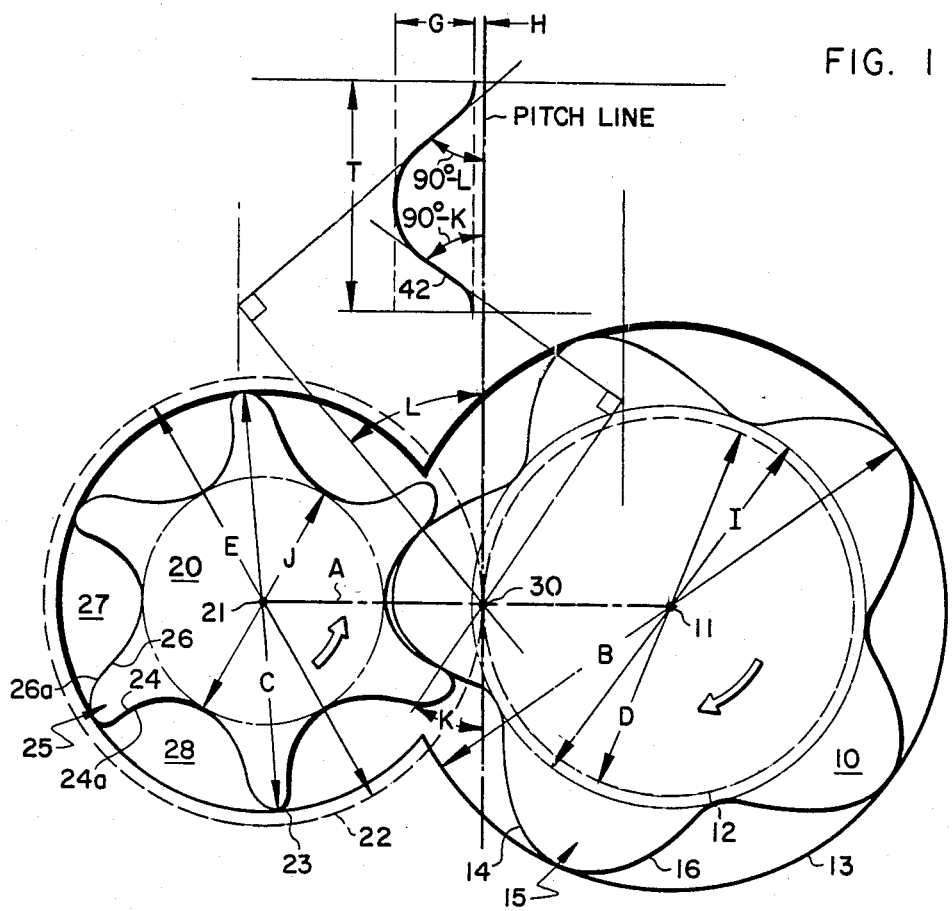
FIG. 1 illustrates the rotor profile of the present invention and the relationships of an individual rack segment to the rotors.

As shown in FIGS. 1 and 3, male rotor 10 meshes with female rotor 20 with a lobe of the male rotor being accepted into the groove defined by the flanks of adjacent lobes of the female rotor. Point 11 is on the axis of the male rotor while point 21 is on the axis of the female rotor. The rotor profiles illustrated in the Figures are taken in a plane transverse to the axes of rotors 10 and 20. The axes of rotors 10 and 20 are parallel. Pitch circle 12 of male rotor 10 is centered on the axis of the male rotor and is tangential with pitch circle 22 of female rotor 20 at pitch point 30. Pitch circle 22 of female rotor 20 is centered about the axis of the female rotor. As is conventional in the design of screw rotors, several parameters are selected in advance of commencing the rotor design process predicated on the application and size of the compressor in which the rotors will be used. Starting with these preselected parameters the rotor profile is developed.

Among the parameters preselected in screw rotor design are the center distance A between the axes of the male and female rotors and the number of lobes on each of the male and female rotors. FIGS. 1 and 3 illustrate a 5:6 rotor combination, i.e., a combination in which the male rotor has five lobes and the female rotor six. The number of lobes on each rotor affects both lobe spacing and lobe strength, both of which are significant in the context of compressing a gas. Characteristically, male screw rotors will have four or five lobes while female rotors for screw compressor applications will have five, six, seven or eight lobes. Still other preselected rotor parameters are the outside diameters and length of the male and female rotors. Outside diameter B of male rotor 10 and outside diameter C of female rotor 20 correspond closely to the inside diameter of the axially intersecting cylindrical bores which form the working chamber of a screw compressor and in which the rotors are housed. All of the above relate directly to compressor capacity which is the driving force in screw compressor design for refrigeration applications. Intersecting circles 13 and 23 illustrate the cross-sectional shape of a working chamber in a screw compressor and the disposition of cooperating male and female rotors within a working chamber. Given the rotational direction for both the male and female rotors 10 and 20 in FIG. 1, convex flank portion 14 of male rotor 10 can be characterized as the leading flank of male rotor lobe 15 while convex flank 16 is the trailing flank of lobe 15. Concave flank 24 of female rotor 20 can be characterized as the leading flank of female rotor lobe 25 while the concave flank 26 is the trailing flank of lobe 25. It will be understood, however, that with respect to female rotor grooves 27 and 28 defined by female rotor lobe 25 and the flanks of the two female rotor lobes adjacent lobe 25, flank 24a is a trailing flank of female rotor groove 28 and flank 26a is a leading flank of female rotor groove 27.

Given initially the number of lobes on each screw rotor, the outside diameter of each rotor and the center distance A between the axes of the rotors, the diameter of the pitch circles of each rotor can be determined. The pitch circle diameter D of the male rotor lobe is found by use of the following equation:

$$D = \frac{2(A)}{1 + \frac{ZF}{ZM}}$$

where A is the aforementioned center distance, ZF is the number of lobes on the female rotor and ZM is the number of lobes on the male rotor. The pitch circle diameter E of the female rotor is found by use of the following equation:

$$E = \frac{2(A)}{1 + \frac{ZM}{ZF}}$$

where A, ZM and ZF are the same parameters as those found in the equation for male pitch circle diameter D immediately above.

Figure 2:
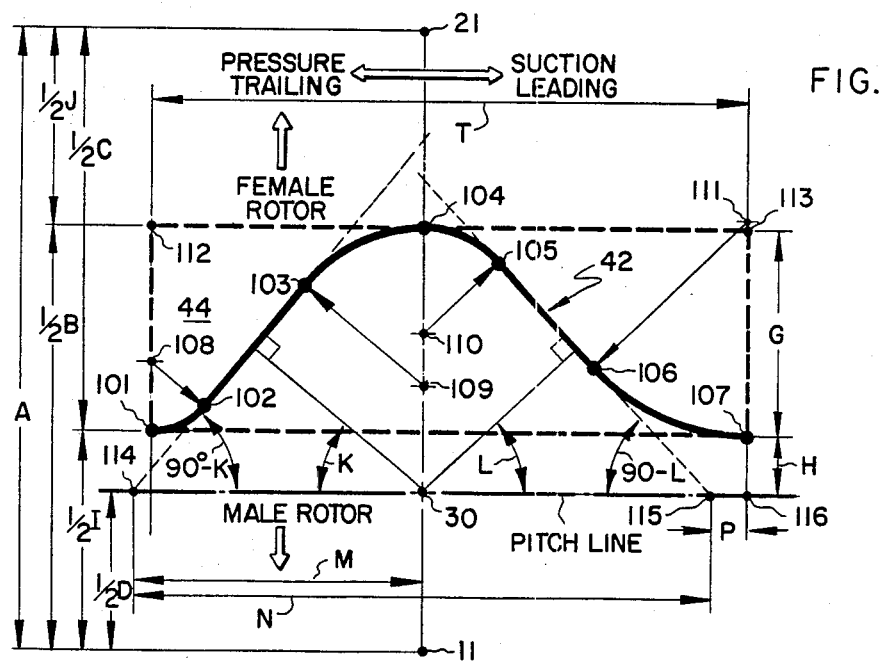
FIG. 2 illustrates an individual segment of the rack of the present invention and the relationship of its segments.

Once the pitch circle diameters for both the male and female rotors are found, the pitch length T can be determined. The pitch length T is determinative of the distance T along rack 40 in which a complete rack segment as shown in FIG. 2 can be defined. One complete rack segment of length T will generate an entire individual lobe on the male rotor and the groove of a female rotor. Rack 40 consists of a repetitive series of complete identical rack segments such as segment 42 of FIG. 1. Pitch length T is determined using the following equations:

$$T = \frac{\pi D}{ZM} = \frac{\pi E}{ZF}$$

Once the value of T is determined, rack height G and distance H can be found. Distance H is the minimum distance any portion of rack 40 approaches the pitch line, the pitch line being the line passing through the pitch point which is tangent to both pitch circle 12 of the male rotor and pitch circle 22 of the female rotor at the pitch point.

The value for rack height G is obtained from the following equation:

$$G = \frac{B}{2} + \frac{C}{2} - A$$

Once height G is determined, the value for distance H is determined as follows:

$$H = \frac{B}{2} + \frac{D}{2} - G$$

Once the values for G and H have been determined, the values for the root circle diameters of the male and female rotors can next be determined. The root circle diameter I of the male rotor 10 is equal to the pitch circle diameter D of the male rotor plus twice the value of H. The root circle diameter J of the female rotor is equal to the pitch circle diameter E of the female rotor minus twice the value of G.

Given values for G, H and T it will be appreciated from FIG. 2 that a box 44 can be defined, two sides of which are of length T and which are parallel to the pitch line. That box 44 is defined by points 101-107-113-112 in the Figure. The side 101-107 of box 44 is located at a distance H from the pitch line while side 112-113 of box 44 is located at a distance G plus H from the pitch line. The dimensions of box 44 are rack height G by pitch length T and, it follows, a complete rack segment capable of generating a complete single lobe on the male rotor and the leading and trailing flanks of adjacent female rotor lobes are defined within the confines of box 44. A rack segment therefore generates a complete male rotor lobe and a groove of the female rotor. The groove of a female rotor is defined by the leading and trailing flanks of the female rotor lobes adjacent to the groove.

Among the other parameters preselected in rotor profile design are the pressure angles of the leading and trailing rotor flanks. A pressure angle is the angle between the line of force through which one lobe acts on a mating lobe and the line which is the common tangent to the pitch circles at the pitch point, i.e., the pitch line. Since the pressure angles K and L are preselected, straight line segments 102-103 and 105-106 of complete rack segment 42 are angularly fixed with respect to the pitch line but cannot as yet be positioned within box 44. Straight line segment 102-103 is perpendicular to the line which passes through the pitch point 30 at an angle K which is the pressure angle of the trailing flank of the male rotor. Straight line segment 105-106 is perpendicular to the line which passes through pitch point 30 at an angle L which is the pressure angle of the leading flank of the male rotor. As opposed to the standards which are specifically set for pressure angles in conventional gear design, where pressure angles of the leading and trailing flanks of a gear tooth are commonly established at 14.5° or 20°, the pressure angles of the present invention are not standardized and may be varied, with other rotor parameters, to optimize screw rotor performance in a screw compressor application. Additionally, in the present invention the pressure angles of the leading and trailing flanks are preferably different which is a further departure from the teachings of conventional involute gear design wherein the pressure angles of the leading and trailing flanks are identical. Also, the pressure angles of the present invention will preferably be in a range between 25° to 45°, which is a complete departure from the teachings of standard gear design in which pressure angles are significantly smaller. It will be remembered that the rationale of the present invention relates directly to the employment of the established principles of gear design and the modification of such principles to facilate the design of screw rotors for use in rotary screw compressor applications. Although well-established, the principles of gear design are formulated and premised on factors many of which are essentially unlike and unrelated to the factors which are of significance in the design of rotary screw compressors.

To proceed with the development of rack 40 and the fixing of rack segment 42 within box 44 in particular, attention is next paid to the positioning of straight line segement 102-103 of rack segment 42 within box 44. Referring concurrently to FIGS. 1 and 2, point 103 generates a point on the trailing flank of the male rotor which is ultimately determinative of the size of the blow holes which exist at the axial ends of a pair of screw rotors within a rotor housing. The blow hole is a leakage path defined by the male and female rotors as well as the rotor housing in a screw compressor. The closer point 103 of segment 102-103 is positioned to point 104 on rack segment 42 the smaller will be the blow holes in a compressor application. The position of segment 102-103 is fixed by the selection of distance M. Distance M is a predetermined rack parameter selected from a range of values which is from 15% to 20% of the outside diameter B of the male rotor. Once distance M is selected, the line of which straight line segment 102-103 is a portion is positioned within box 44. Straight line rack segment 102-103 is a portion of the line passing through the pitch line at the distance M from pitch point 30 on the pitch line and at an angle (90 minus K) degrees with respect to the pitch line.

With the position of the straight line of which rack segment 102-103 being fixed, the position of point 103 on that straight line can also be fixed. Point 103, in addition to being one end point of straight line rack segment 102-103, is an end point of circular arc segment 103-104 the center of which is point 109. Like point 109, point 104 is on the line perpendicular to the pitch line passing through pitch point 30. Point 104 is located at a distance (G+H) from the pitch point on that perpendicular. Circular arc section 103-104 is tangent to both side 112-113 of box 44 and the straight line of which rack segment 102-103 is a portion at points 104 and 103, respectively. With the above criteria circular arc portion 103-104 centered at point 109 can be fixed on rack segment 42 within box 44.

The next rack segment to be positioned within box 44 is straight line segment 105-106. Similarly to rack segment 102-103, the angle of rack segment 105-106 with respect to the pitch line is determined by the preselected pressure angle L and is equal to the angle (90 minus L) degrees. In order to position segment 105-106 within box 44 resort is made to a preselected parameter R. R is a ratio descriptive of the overall thickness of an individual lobe of the male rotor and therefore is also descriptive of the space between the lobes on the male rotor. The ratio R has a nominal value of 1.0 but is selectable in a range of from 0.8 to 1.2. The smaller ratio R is set the narrower are the male rotor lobes overall. The narrower overall the male rotor lobes are, given already established rack parameters G and T, the more volume will exist between female rotor lobes and the more the volume will be in which gas can be accommodated for compression. Therefore a smaller value for ratio R is preferable. The value of R must also be selected, however, remembering that lobe strength is a function of lobe thickness.

In order to fix straight line rack segment 105-106 within box 44, the ratio R is multiplied by the previously determined pitch length T to determine distance N which is illustrated in FIG. 2. As can be seen, the distance N is the distance on the pitch line from point 114 to point 115. Point 114 is the point at which straight line segment 102-103 extended intercepts the pitch line and point 115, which is established by the distance N, is the point on the pitch line through which straight line rack segment 105-106 extended passes through the pitch line at the angle (90 minus L) degrees. With the distance N established, the position, though not the length, of straight line segment 105-106 can be fixed within box 44.

With the establishment of the position, but not the length, of straight line rack segment 105-106 within box 44, circular arc section 104-105 of rack segment 42 can next be determined. Circular arc segment 104-105 is an arc centered at point 110 which is on the line perpendicular to the pitch line at pitch point 30. Circular arc segment 104-105 is also an arc which is tangent to both sides 112-113 of box 44 and straight line rack segment 105-106 extended at points 104 and 105, respectively. With circular arc rack segment 104-105 established by the above criteria within box 44, circular arc portions 101-102 and 106-107 of rack segment 42 remain to be determined.

Circular arc segment 106-107 is determined by the preselection of a parameter P which is a distance selected to be between plus and minus 3% of the outside diameter B of the male rotor. The distance P establishes the location of point 116 on the pitch line. If a negative value for P is chosen, point 116 will be between the pitch point and point 115 on the pitch line. Selection of a positive value for P will result in point 116 being on the side of point 116 opposite the side on which the pitch point is located. Point 116 is the point through which side 107-113 extended of box 44 passes perpendicularly through the pitch line. With the position of point 107 now capable of being fixed at a distance H from the pitch line, circular arc portion 106-107 can be fixed on rack segment 42 as it is a circular arc which is tangent to both straight line rack segment 105-106 and the line which is parallel to the pitch line at a distance H from the pitch line. Circular arc rack segment 106-107 is tangent to the aforementioned lines at points 106 and 107 respectively and is centered on side 107-113 of box 44 extended.

Finally, circular arc portion 101-102 of rack segment 42 can be determined. Circular arc portion 101-102 is centered at point 108 of side 101-112 of box 44 extended and is tangent to both straight line rack segment 102-103 at point 102 and the line parallel to the pitch line at a distance H from the pitch line at point 101. The straight line extended of which side 101-112 of box 44 is a portion, is a straight line perpendicular to the pitch line at pitch distance T from side 107-111 of box 44, the location of which has previously been established. Rack segment 42 having been developed, rack 40 which consists of a series of identical rack segments, is next capable of being constructed. As is shown in FIG. 3, which illustrates the construction of a rack of the present invention, and as should be apparent from the above described manner in which an individual rack segment is developed, not only are the circular arc and straight line segments of an individual rack segment geometrically tangent to adjoining circular arc and/or straight line segments within an individual rack segment, the circular arc segments at the ends of an individual rack segment, i.e. circular arc rack segments 101-102 and 106-107 of the individual rack segment 42 of FIG. 2, are each geometrically tangent to the end circular arc segment of the indentical adjoining individual segments within a rack. The number of consecutive rack segments necessary to generate a complete rotor profile is equal to the number of lobes on the rotor having the greatest number of lobes.

Once rack 40 is established, the rotor profile of the present invention can be generated. When the pitch circles of the male and female rotors are rotated to drive rack 40 parallel to the pitch line as is illustrated in FIG. 3, each portion of a discrete rack segment 42 that is, each of the four circular arc segments and two straight line segments which make up an individual complete rack segment, generates a specific portion of one lobe of both the male and female rotors. A single rack segment, such as rack segment 42, generates the complete profile of both one male lobe and effectively one female rotor lobe. As the pitch circles are rotated to drive rack 40, each individual point of the rack generates a point on each of the male and female rotor profiles as the line normal to the surface of the rack, at that individual point on the rack, passes through the pitch point. For example, in FIG. 3 it will be seen that as line 32, which is normal to an arbitrary point 34 on rack 40, passes through pitch point 30, points on both male rotor 10 and female rotor 20, coincident with rack point 34 are generated. The profile of the present invention, which is characteristic of a rack having two straight line segments and four circular arc segments, is a profile in which both the leading and trailing flanks of both the male and female rotors include involute portions. The involute portions are generated by the straight line segments of the rack. Because of the method by which rack 40 is obtained and its composition of only straight line and circular arc segments, a rotor profile generated by rack 40 will be devoid of circular arc portions.

Referring to FIG. 4, one typical profile of a male rotor and groove of a female rotor of the present invention will be seen to include six specific portions, each of the portions being generated by one of the four circular arc segments or two straight line segments of the rack. Male lobe 210 and the groove 220 between adjacent female lobes 227 and 228 are shown separated in FIG. 4 for clarity and the rotors are actually in contact, in operation, at points 263 and 273. Both points 263 and 273 are generated by point 253 on rack segment 200. Rack segment 200 of FIG. 4, which is developed in accordance with the above teachings, consists of a first circular arc segment 201 between points 250 and 251, a first straight line segment 202 between points 251 and 252, a second circular arc segment 203 beteen points 252 and 253, a third circular arc segment 204 between points 253 and 254, a second straight line segment 205 between points 254 and 255 and finally, a fourth circular arc segment 206 between points 255 and 256. The rotor lobes generated by rack segment 200 likewise consist of six individual segments.

In accordance with the rack motion described immediately above wherein the rack is driven parallel to the pitch line by the rotation of the pitch circles, first circular arc segment 201 of rack segment 200 generates first curved portion 211 between points 260 and 261 on male lobe 210 and simultaneously first curved portion 221 between points 270 and 271 on female lobe 227. Likewise, first straight line segment 202 generates involute portion 212 between points 261 and 262 on male lobe 210 and involute portion 222 between points 271 and 272 on female lobe 227. Second circular arc segment 203 on rack segment 200 generates curved portion 223 between points 272 and 273 on female lobe 227 and second curved portion 213 between points 262 and 263 on male lobe 210. Third circular arc segment 204 generates curved portion 224 between points 273 and 274 on female lobe 228 and third curved portion 214 between points 263 and 264 on male lobe 210. Second straight line segment 205 between points 254 and 255 on rack segment 200 generates both involute portion 225 between points 274 and 275 on female lobe 228 and second involute portion 215 between points 264 and 265 on male lobe 210. Finally, fourth circular arc segment 206 on the rack segment generates both curved portion 226 between points 275 and 276 on female lobe 228 and fourth curved portion 216 between points 265 and 266 on male rotor lobe 210. In operation, an involute portion on a male rotor lobe will contact only an involute portion on a female rotor lobe which was generated by a straight line segment of the rack identical to the straight line segment from which the male involute portion was generated. It will be remembered that there are more female rotor lobes than male rotor lobes and that any male rotor lobe will be accommodated within any female rotor groove. Likewise any one of the four discrete curved portions on a male rotor lobe will contact, in operation, only a curved portion on a lobe of the female rotor which was generated by a circular arc segment on the rack identical to the circular arc segment from which that particular curved portion on the male rotor was generated from. The characterization or naming of the curve generated on both the male and female rotor profiles as the line normal to each point of a circular arc rack segment passes through the pitch point, when the rack is driven along the pitch line by the rotation of the pitch circles of the rotors, is not consequential as is evident from the description of rotor profiles in many prior U.S. patents. Rather, it is the method by which such curves are generated, as taught herein, which is of consequence and adequately characterizes the screw rotor profile of the present invention. Given the method of profile generation described above, the characteristic screw rotor profile will necessarily follow.

If a name were to be ascribed to the curve generated by the circular arc rack segments, the term "trochoidal fillet" would be appropriate. The term trochoidal fillet finds its roots in gear design and the curve it describes is an envelope curve based upon a family of circles. With reference to Chapter 8 of the GEAR HANDBOOK edited by Dudley (McGraw-Hill: 1962), a trochoid is defined as a curve traced on a rotating plane by a designated point on a second plane. It is also therein stated that when the second plane moves in a straight line, a curve entitled a "rack trochoid" is generated. This rack trochoid is said to be curve on a gear traced by a point on a meshing rack. The GEAR HANDBOOK goes on to develop the concept of the trochoidal fillet with the concept being based upon the rack trochoid. It is stated therein that if a circle is visualized at the corner of a generating rack, the center of the circle can be considered to generate a rack trochoid. Further, it is stated that if circles are visualized centered on each point of the rack trochoid, an envelope curve of this family of circles will result. The trochoidal fillet is then an envelope of this family of circles. The curves generated by the circular arc segments of the rack of the present invention can thus be described as trochoidal fillets and each flank on each lobe of both the male and female rotors will have a discrete involute portion disposed between discrete portions of trochoidal fillet. The German term "Kreishullbahn" relates directly to the concept of the trochoidal fillet and is likewise appropriate.

It will be appreciated that by virtue of the common tangency of the circular arc portions and straight line segments of the rack at their respective points of intersection, the rotor profile of the present invention will be continuous and smooth with no point discontinuities or corners being found on either the male or female rotor lobes. Nor will there be any discontinuity or corner where a first lobe on the profile of a rotor meets an adjoining lobe. The profile of a rotor set of the present invention is also characterized by a unique relationship between the individual rotors and their pitch circles. In general, in the screw rotor art a male rotor is defined as one in which each lobe and the groove between individual lobes has a major portion located outside the pitch circle of the male rotor. A female rotor is one in which the major portion of each lobe and the grooves therebetween are located inside the pitch circle. In other words, the leading and trailing flanks of the lobes of known rotor profiles cross the pitch circle of the rotors on which they are located. In the present invention, the entirety of each lobe and the grooves therebetween on the male rotor profile are located outside the pitch circle of the male rotor while the entirety of each lobe and groove therebetween of the female rotor profile are located inside the pitch circle of the female rotor. The profile of the rotor set of the present invention therefore can be characterized in that no flank of a rotor lobe, whether it be on a male or female rotor, crosses its respective pitch circle.

The rotor profile of the present invention has a closed meshed line and a small blow hole. The blow hole exists only between the most external points of the mesh line and the rotor housing. The rotor housing, as earlier mentioned, defines a working chamber characterized as two intersecting parallel cylindrical bores closely dimensioned to the outside diameter and length of the male and female rotors.

The mesh line is a line upon which the point of contact of any two male and female rotor lobes always lies. The mesh line 60 illustrated in FIGS. 3 and 3A, for the rotor profile taught herein, in every case passes through the point of contact of the pitch circles, i.e., through the pitch point. To minimize the size of blow hole 70, the mesh line 60 must extend as far as possible towards cusp 80 which represents the intersection of the cylindrical bores defining the working chamber in the rotor housing in a screw compressor. It can be seen from FIG. 3A that mesh line 60 of the rotors of the present invention includes two straight line segments which are the paths of contact of the involute flank portions of the male and female rotors and four curved segments corresponding to the path of contact of the circular-arc-generated curved portions of the male and female rotors. The closer the mesh line extends toward cusp 80 the smaller the blow hole will be. The longer the straight line portions of the mesh line are (hence the longer the involute flank portions of the rotors and straight line segments of the rack are) the shorter will be the leakage path along the length of a pair of meshing rotors having the profile taught herein. The closed mesh line is a complete departure from the teachings of conventional gear design wherein leakage between gears is not a consideration.

Another characteristic of the present invention relates to the selection of pressure angles K and L. The selection of pressure angles K and L is determinative of the angle between the straight line segments of the rack segment 42 and the pitch line. It will therefore be appreciated that the selection of pressure angle K also directly affects the position of point 103 on rack segment 42 and therefore the size of the blow hole. Of course, the selection of any one parameter of rack 40 affects the remaining portions of the rack. Pressure angles K and L in the present invention are preferably in the range of from 25° to 45° and are dissimilar with the pressure angle K of the trailing flank of the male rotor being less than the pressure angle L of the leading flank of the male rotor. Additional parameters affecting blow hole size are the lead or wrap angle of the male rotor and the length of the rotors. The wrap angle of the male rotor of the present inventions is preferably less than 360°.

Whereas the development of rotor profiles for use in screw compressor applications has heretofore been somewhat of an arcane art, the profile of the present invention and its development are straightforward. By varying the values of the preselected parameters, screw rotor profiles having lobe flanks consisting of involute portions disposed between circular-arc-generated curved portions will result. Without undue experimentation and given a particular application for a screw compressor, such as use in a 140 ton air conditioning system, high performance screw rotor profiles can be developed quicky and efficiently. Once a rotor profile is generated, the corresponding rotors can be manufactured by a method such as by hobbing. The profile of the hobbing tool with which the rotors may be manufactured will be in direct correspondence to the profile of the defined rack. Alternatively, the rotors may be manufactured by cutting. Hobbing, however, is preferable by virtue of the continuous advance of the hob as it and the rotor blank are rotated. No indexing is required, as in cutting, where the rotor blanks are required to be turned before cutting of the next lobe can commence.

Exemplary of the profiles which can be developed in accordance with the present invention are the 5:6 and 5:7 profiles of FIGS. 5 and 6. FIG. 6 illustrates a rotor profile and the rack segment from which it was generated where the following parameters were preselected:
Lobe Combination: 5 Lobe Male, 6 Lobe Female
Outside Diameter Male: 158.8 mm
Outside Diameter Female: 119.3 mm
Pressure Angle K: 30°
Pressure Angle L: 38°
Ratio R: 0.94
Center Distance A: 116.14 mm
Distance M: 26.5 mm
Distance P: +4.0 mm FIG. 5 illustrates a rotor profile and the rack segment from which it was generated where the following parameters were preselected:
Lobe Combination: 5 Lobe Male, 7 Lobe Female
Outside Diameter Male: 152 mm
Outside Diameter Female: 127 mm
Pressure Angle K: 30°
Pressure Angle L: 38°
Ratio R: 0.94
Center Distance A: 116.14 mm
Distance M: 27.5 mm
Distance P: +4.0 mm It will be appreciated that given the relationships set forth above and the ranges established for the preselected parameters, a large number of rotor profiles are capable of being generated quickly through the employment of a computer. The development of a computer program by which the teachings above can be implemented is well within the capabilities of those skilled in the art of rotor profile design. Computer driven printers are useful in graphically portraying the rotor profile which results from a particular set of input data. The basic composition of the profile, however, remains consistent irrespective of the variance of the input parameters. It has been found useful to rate each rotor profile generated as to its desirability given a particular application in which a compressor is to be employed. A most convenient rating method relates to the totality of the leakage areas within a compressor. That parameter, which is an overall leakage parameter, is a ratio of the entire leakage area within a screw compressor as compared to the volume of the space available for compressing gas between the rotors.

What I claim is:

1. A screw rotor having a plurality of lobes with convex flanks, where the profile of an individual lobe of the rotor in a plane transverse to the axis of the rotor comprises:
   a leading flank having a discrete involute portion disposed between discrete portions of trochoidal fillet; and
   a trailing flank having a discrete involute portion disposed between discrete portions of trochoidal fillet.

2. The screw rotor according to claim 1 wherein one of said discrete portions of trochoidal fillet on said leading flank abuts one of said trochoidal fillet portions on said trailing flank at the tip of said lobe profile and wherein the trochoidal fillet portions of said leading and trailing flanks other than said portions at the tip of said lobe profile each abut a trochoidal portion on an adjacent rotor lobe.

3. The screw rotor according to claim 2 wherein each one of said discrete portions of any of said leading and trailing flanks of any lobe on the profile of said screw rotor is geometrically tangent to the two adjacent discrete rotor lobe portions between which it is disposed on said profile, at the points of its intersection with said two adjacent portions respectively, so that the profile of said rotor is a continuous curve devoid of point discontinuities.

4. The screw rotor according to claim 3 wherein each flank of each lobe of said screw rotor is within the pitch circle of said rotor.

5. The screw rotor according to claim 4 wherein each lobe of said rotor is asymmetrical.

6. A screw rotor having a plurality of lobes with concave flanks, where the profile of an individual lobe of the rotor in a plane transverse to the axis of the rotor comprises:
   a leading flank having a discrete involute portion disposed between discrete portions of trochoidal fillet; and
   a trailing flank having a discrete involute portion disposed between discrete portions of trochoidal fillet.

7. The screw rotor according to claim 6 wherein one of said discrete portions of trochoidal fillet on said leading flank abuts one of said trochoidal fillet portions on said trailing flank at the tip of said lobe profile and wherein the trochoidal fillet portions of said leading and trailing flanks other than said portions at the tip of said lobe profile each abut a trochoidal portion on an adjacent rotor lobe.

8. The screw rotor according to claim 7 wherein each one of said discrete portions of any of said leading and trailing flanks of any lobe on the profile of said screw rotor is geometrically tangent to the two adjacent discrete rotor lobe portions between which it is disposed on said profile, at the points of its intersection with said two adjacent portions respectively, so that the profile of said rotor is a continuous curve devoid of point discontinuities.

9. The screw rotor according to claim 8 wherein each flank of each lobe of said screw rotor is within the pitch circle of said rotor.

10. The screw rotor according to claim 9 wherein each lobe of said rotor is asymmetrical.

11. A pair of cooperating male and female helical screw rotors having parallel axes, each of said rotors having a plurlity of lobes having leading and trailing flanks, each of said flanks on each of said lobes of each of said male and female rotor having a profile comprising a discrete involute portion disposed between discrete portions of trochoidal fillet.

12. The screw rotors according to claim 11 wherein any discrete portion on any flank on any lobe of the profile of any of said male and female rotors is geometrically tangent to the two adjacent discrete rotor lobe portions between which said portion is disposed on said profile, at the points of its intersection with said two adjacent portions respectively, so that the profiles of both said male and female rotors are continuous curves devoid of point discontinuities.

13. The screw rotors according to claim 12 wherein each flank of each lobe of any of said male and female rotors is within the pitch circle of the rotor on which said flank is located.

14. The screw rotors according to claim 13 wherein, in operation, an involute portion on a flank of a lobe of said male rotor contacts only an involute portion on a flank of said female rotor.

15. The screw rotors according to claim 14 wherein the profiles of the lobes of both said male and female rotors are asymmetrical.

16. Cooperating male and female screw rotors each having profiles, in a plane transverse to the axes of said rotors, generated from a single rack having a plurality of identical individual rack segments, each of the identical individudal rack segments having two straight line segments and four circular arc segments, the profiles of both said male and female rotors being generated as the line normal to each point on the rack passes through the pitch point of said rotors while the pitch circles of said rotors are rotated to drive said rack parallel to the pitch line of said rotors, the profile of each flank on each lobe of said male and female rotors including a discrete involute portion generated by a straight line rack segment disposed between discrete curved portions generated by two of said circular arc rack segments.

17. The screw rotors according to claim 16 wherein the profile of each of said male and female rotor lobes is a continuous curve devoid of point discontinuities.

18. The screw rotors according to claim 17 wherein no discrete portion of any flank of any lobe on any of said male and female rotors crosses the pitch circle of the rotor on which said discrete portion is located.

19. The screw rotors according to claim 18 wherein each lobe of both said male and female rotors is asymmetrical.

* * * * *